(No Model.) 2 Sheets—Sheet 1.
P. SICOTTE.
CUTTER FOR MAKING MOLDINGS.
No. 417,748. Patented Dec. 24, 1889.
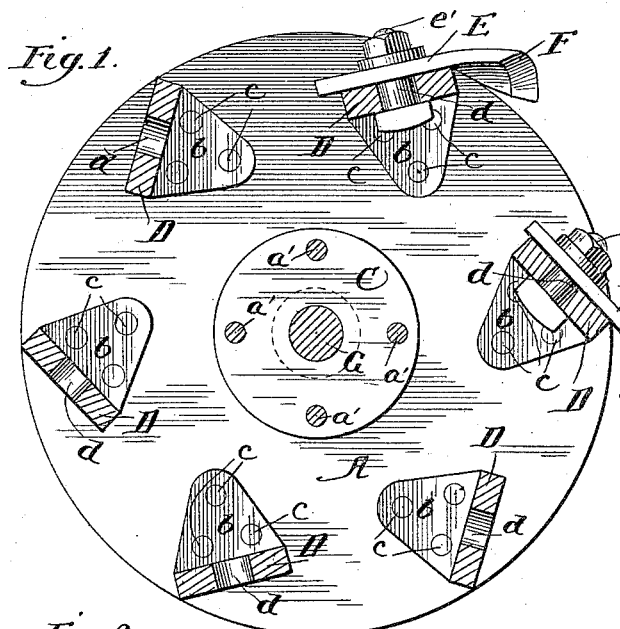
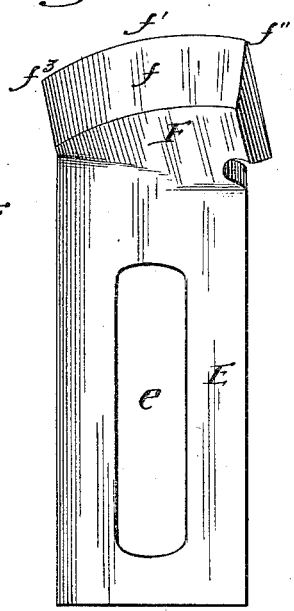
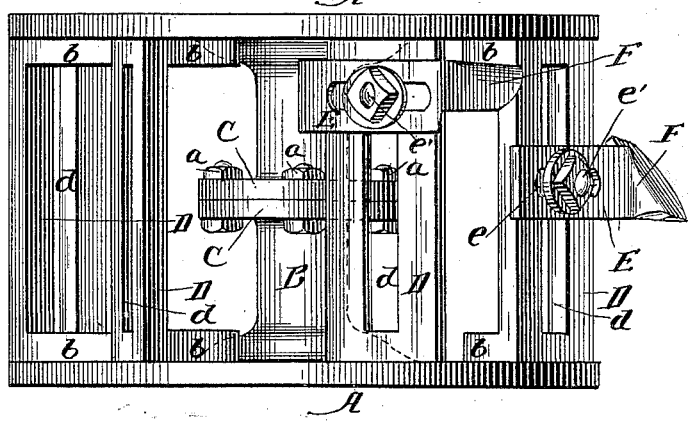
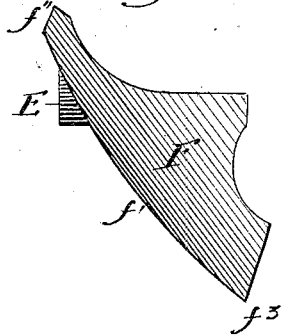
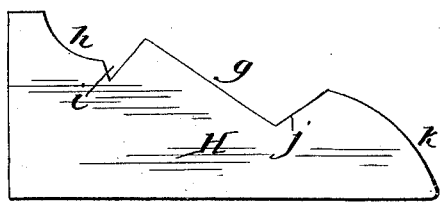
Witnesses.
C.W. Bond.
H.B. Hallock.
Inventor:
Pierre Sicotte (No Model.) 2 Sheets—Sheet 2.

P. SICOTTE.
CUTTER FOR MAKING MOLDINGS.

No. 417,748. Patented Dec. 24, 1889.

Witnesses:
O. W. Bond
H. B. Hallock

Inventor
Pierre Sicotte

UNITED STATES PATENT OFFICE.

PIERRE SICOTTE, OF CHICAGO, ILLINOIS, ASSIGNOR TO HIMSELF AND LOUIS H. BOURRET, OF SAME PLACE.

CUTTER FOR MAKING MOLDINGS.

SPECIFICATION forming part of Letters Patent No. 417,748, dated December 24, 1889.

Application filed November 10, 1888. Serial No. 290,500. (No model.)

*To all whom it may concern:*

Be it known that I, PIERRE SICOTTE, a subject of the Queen of Great Britain, residing at Chicago, in the county of Cook and State of Illinois, have invented certain new and useful Improvements in Cutters for Making Moldings; and I do hereby declare that the following is a full, clear, and exact description of the invention, which will enable others skilled in the art to which it pertains to make and use the same, reference being had to the accompanying drawings, forming a part hereof, in which—

Figure 6:
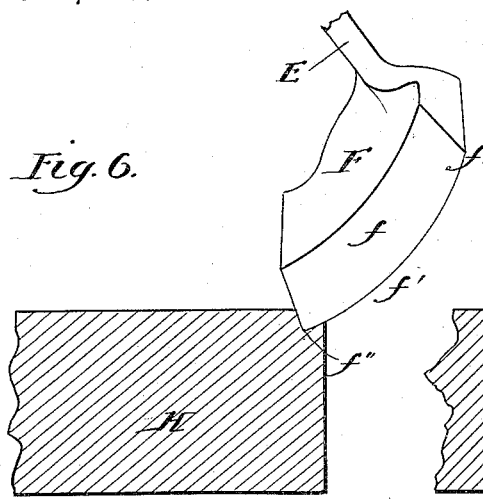
Figure 7:
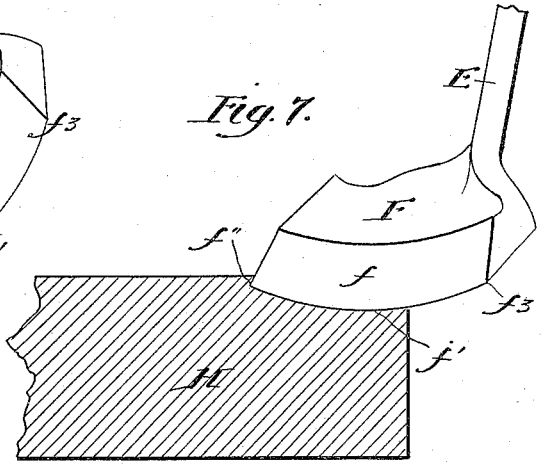
Figure 8:
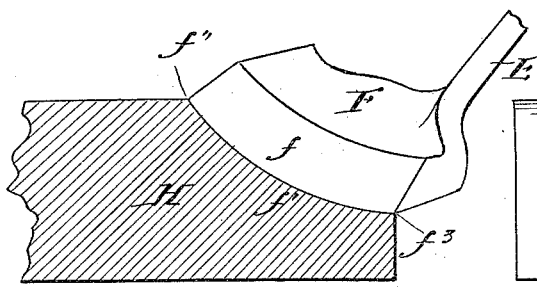
Figure 9:
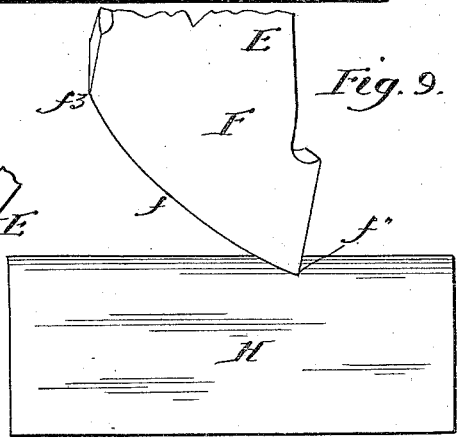
Figure 10:
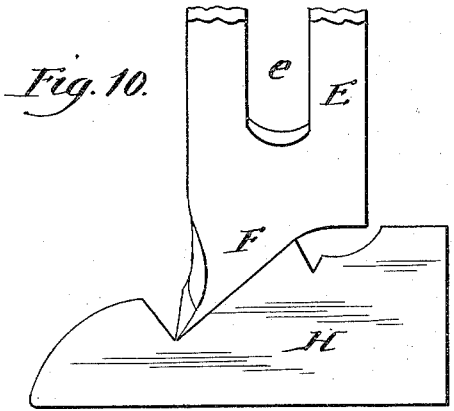

Figure 1 is a section showing a face view of the disk with two of the cutters. Fig. 2 is a plan view of the cutter-head. Fig. 3 is a plan view of one of the cutters. Fig. 4 is a rear view of the cutter shown in Fig. 3. Fig. 5 is an end view of a piece of molding cut by the tools. Figs. 6, 7, and 8 are front views of a cutter, showing the several positions of the cutter at its work. Figs. 9 and 10 are rear views showing the positions of the cutter at work.

The object of this invention is to construct a cutter by means of which moldings of various configurations can be produced by cutting the desired shape on the piece of wood and have the cutting operation leave a smooth face in cutting across the grain of the wood; and its nature consists in providing a cutting-tool having a cutting-edge of a shape for the desired configuration formed on the arc of a circle, with its entering end or corner in advance of its terminal end or corner; in combining the cutter with a rotary head, on which the necessary adjustments can be made for several cutters to operate and cut the configuration, and in the several parts and combination of parts hereinafter described, and pointed out in the claims as new.

In the drawings, A represents disks or plates forming the main portion of the head, two disks or plates being used, each corresponding in size and forming the sides of the head.

B is a collar or hub, one for each disk A, located at the center of the disk.

C is a flange on the end of each disk, by means of which and suitable bolts $a$, passing through holes $a'$, the disks A are connected one to the other, for the collars or hubs to form a means for supporting the disks on a shaft.

D are cross-bars running from one disk A to another, each cross-bar having at each end an ear $b$, for attaching the cross-bar to the disks by bolts or screws $c$, and as many cross-bars are to be used as it is desired there shall be cutters, each cross-bar having a longitudinal slot $d$.

E is the shank of the tool, having therein a longitudinal slot $e$, through which and the slot $d$ of the cross-bar D a bolt $e'$ is passed, by means of which the tool is clamped to the cross-bar D. The slots $d$ and $e$ permit of the adjustment of the tool for its blade to project the desired distance beyond the edge or periphery of the head, and for the tools to stand in different relations one to the other, to act and cut their respective faces for the molding.

F is the blade of the tool, standing diagonal to its shank to have its ends on opposite sides of the shank, with the advance end or corner in front and the terminal end or corner in rear of the shank, with the blade as a whole inclined forward. The blade at its acting edge has its top face $f$ beveled off, with its under face straight, to form a cutting-edge $f'$, which edge is on the arc of a circle extending from the advance corner $f''$ to the terminal corner $f^3$. The shape of the cutting-blade and its position in relation to its shank and the form of its cutting-edge are clearly shown in Figs. 3 and 4.

G is the shaft, on the end of which the disks A are secured in any suitable manner, the shaft passing through the collars or hubs B.

H is a piece of wood for the molding, the face of which is cut by the cutters to produce the desired configuration, such as an inclined incut face $g$, a concave face $h$, a V-shaped face $i$, an inclined face $j$, and a convex face $k$, as shown in Fig. 5, or such other configuration as may be desired.

A cutter F is attached to a cross-bar D by its shank E, and as many cutters as are necessary to produce the desired configuration in the wood H are used, the respective cutters having each a cutting-edge for producing one of the cuts $g$, $h$, $i$, $j$, or $k$. Each cutter is adjusted by the slot $e$ in its shank E and the slot $d$ in the cross-bar D, to which it is attached, and the adjustments are had by loosening the bolt $e'$ and moving the shank E out or in for the required depth of cut, and sidewise for the line of cut, and when the desired adjustment is had the cutter is locked in its adjusted position by tightening the bolt $e'$.

The head shown is provided with six cross-bars D, enabling that number of tools to be used; or a less number of cutters can be used by leaving some of the cross-bars unoccupied; or one or more cutters can be used attached to a single cross-bar; and it is to be understood that by increasing the number of cross-bars D a greater number of cutters can be used, one or more cutters for each cross-bar.

The shaft G is rotated in any suitable manner, driving the disks A, and with them the cutter-blades F. The strip or piece of wood to be acted upon is placed in a suitable bed below the head and in line for the action of the cutters—one or more—and is advanced against the rotation of the head. Each cutter, as it descends, will enter the wood with the advance corner first, as shown in Fig. 6, and with the advance of the cutter the edge $f'$ will follow the first start and cut the material, as shown in Fig. 7, and the continued advance of the cutter will bring the entire cutting-edge $f'$ into use, as shown in Fig. 8. The manner in which the advance corner of the cutter enters the wood is further illustrated in Fig. 9, and its position at the final cutting is shown in Fig. 10, both Figs. 9 and 10 being views from the rear of the blade.

The set of the blade diagonal to its shank and the curved cutting-edge produce a draw action in passing through the wood, and at the same time the cutting is a gradual one, by which all liability of splintering or breaking out small pieces of wood when cutting across the grain is entirely obviated.

The cutters or blades F follow each other in succession, and each cutter, irrespective of its shape in cross-section, acts by its advance corner entering the wood first, and the balance of the cutting-edge $f'$ follows after, on the principle of a draw cut, and each cutter or blade F, as the wood is advanced, follows in its cut where it left off on its previous rotation, thus producing a continuous even cut of the same depth and shape for the entire length of the piece of wood, and this cut will be smooth and uniform.

The cutter is intended for use in cutting across the grain of the wood, and is specially adapted for producing the desired configuration for the caps and base-pieces of casings for doors and windows and other like purposes, but can be used in cutting across the grain of wood in the production of any article having straight-line cuts.

What I claim as new, and desire to secure by Letters Patent, is—

1. A cutter for making moldings, having a diagonal and forwardly-inclined blade, with an entering corner in advance of and a terminal corner in rear of the shank, and a curved cutting-edge extending from the advance to the rear corner, substantially as and for the purposes specified.

2. A cutter consisting of a shank E and a blade F, standing diagonal and forwardly inclined to the shank for its advance corner to be in front of the shank and its terminal corner at the rear of the shank, substantially as specified.

3. A rotary head, in combination with a cutter having a diagonal and forwardly-inclined blade, with an entering corner in advance of and a terminal corner in rear of the shank, and a curved cutting-edge extending from the entering corner to the terminal corner, substantially as and for the purposes specified.

PIERRE SICOTTE.

Witnesses:
O. W. BOND,
H. B. HALLOCK.